(No Model.)

W. N. RUMELY.
JOURNAL BEARING.

No. 477,272. Patented June 21, 1892.

Witnesses:
M. S. Belden
P. P. Sheehan

William N. Rumely
Inventor
by James W. See
Attorney

UNITED STATES PATENT OFFICE.

WILLIAM N. RUMELY, OF LA PORTE, INDIANA.

JOURNAL-BEARING.

SPECIFICATION forming part of Letters Patent No. 477,272, dated June 21, 1892.

Application filed February 25, 1892. Serial No. 422,743. (No model.)

*To all whom it may concern:*

Be it known that I, WILLIAM N. RUMELY, of La Porte, La Porte county, Indiana, have invented certain new and useful Improvements in Journal-Bearings, of which the following is a specification.

My improvements will be readily understood from the following description, taken in connection with the accompanying drawings, in which—

Figure 1:
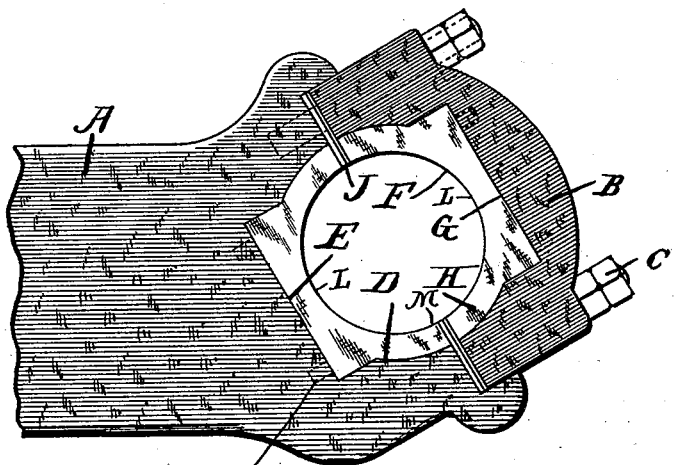
Figure 2:
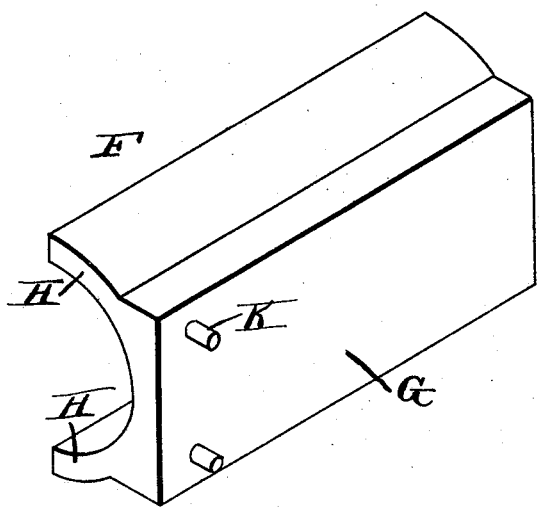

Figure 1 is an end elevation of a journal-bearing exemplifying my improvement as applied to the crank-bearing of a girder-bed steam-engine, and Fig. 2 a perspective view of one of the half-shells of the bearing.

In the drawings, A indicates the body or pedestal of the bearing, illustrated in the example as formed by the crank end of the girder-bed of a steam-engine, this body, as usual, carrying the bed-half of the bearing, the other half being formed by a cap-half secured to the bed-half; B, the cap-half of the body of the bearing, secured to the bed-half in the usual manner; C, the usual bolts for holding the cap in place; D, a circular recess formed half in the body and half in the cap concentric with the axis of the journal-bearing to be formed within the recess; E, a flat-bottomed recess forming an extension of the circular recess into the bearing-body, the plane of the floor of this recess being parallel with the joint of separation between the cap and body, and the shores of the body being parallel and at right angles to the floor, a precisely-similar flat-bottomed recess being formed in the cap; F, two half-boxes forming the bearing proper and disposed as linings within the recesses in the body and cap and fitting those recesses and having a circular bore to properly fit the shaft; G, extensions from these half-boxes to fit and fill the flat-bottomed recesses E in the body and cap; H, wing portions of the half-boxes filling the circular portions of the recesses in the body and cap, these wings therefore extending from the flat extensions G to the joint of separation between the halves; J, the usual shims, disposed in the joint of separation between the half-boxes and between the body and cap and permitting the cap to be bolted solid to place without danger of the bearing being clamped too tightly upon the shaft; K, dowel-pins projecting from the flat surfaces of the extensions G of the half-boxes into appropriate dowel-holes in the recesses occupied by those extensions; L, those portions of the bore of the bearing most subjected to wear, those portions being at points ninety degrees distant from the joint of separation between the halves, it being understood that the joint of separation will be arranged in various planes according to the circumstances under which the bearing is used, and M those points in the bore of the bearing at the joint of separation. The half-boxes are cast in suitable molds and formed to properly fit their recesses in the body and cap and to form a proper bearing for the shaft. The dowel-pins in the absence of end flanges for the half-boxes prevent sidewise displacement of the half-boxes in their recesses.

In the case of the main bearing of a horizontal steam-engine, such as the case illustrated in Fig. 1, it is found in practice that as wear takes place about twenty-five per cent. of the wear will occur upon the shaft, thus reducing the diameter of the journal, and that seventy-five per cent. of the wear will take place at the points L in the bearing, thus causing the bearing to be elliptical, very little wear taking place at the points M. The bearing may be closed up by reducing the thickness of the shims J in the usual manner; but in the present case provision is made for additional compensation for wear. Flat shims are to be placed behind the flats of the extensions G, thus closing up the bearing independent of any adjustment which may be given to the cap. The flat extensions and flat-bottomed recesses give broad surfaces for the reception of these shims, and the shores of the flat recesses give steady support to the half-boxes as they are thus shimmed out in their recesses. As the half-boxes are thus shimmed out in their recesses, the wing portions H move inwardly away from the walls of the circular recesses, and in the segmental spaces thus formed shims may be inserted to swing the wing portions of the bearing inwardly to restore the bearing to circular form. This adjustment of the half-boxes in their recesses may be carried on until the half-boxes are worn too thin to be safe for further use.

It is quite common to arrange bearings with "quarter-boxes" and means for adjusting them, the usual plan being to form the bearing in four segmental portions, viz: bed, body, and two cheek-pieces, separate adjusting means being provided for the cheek-pieces. My device does not belong to that class of bearings, as I employ but two sections and secure with them all the requisite compensation for wear.

I claim as my invention—

In a journal-bearing, the combination, substantially as set forth, of a bearing-body formed of a bed-half and a cap-half united and provided with a circular recess extended in depth oppositely into flat-bottomed recesses E, extending the length of the body, and two half-boxes separably seated in said body and provided with outer extensions G, extending the length of the half-boxes and fitting said flat-bottomed recesses, and with wings H, fitting said circular recesses.

WILLIAM N. RUMELY.

Witnesses:
OSCAR VER NOORG.
WM. S. JANES.